Sept. 5, 1967   J. H. HARVEY   3,339,688
COUPLING DEVICE
Filed Sept. 20, 1963   2 Sheets-Sheet 2

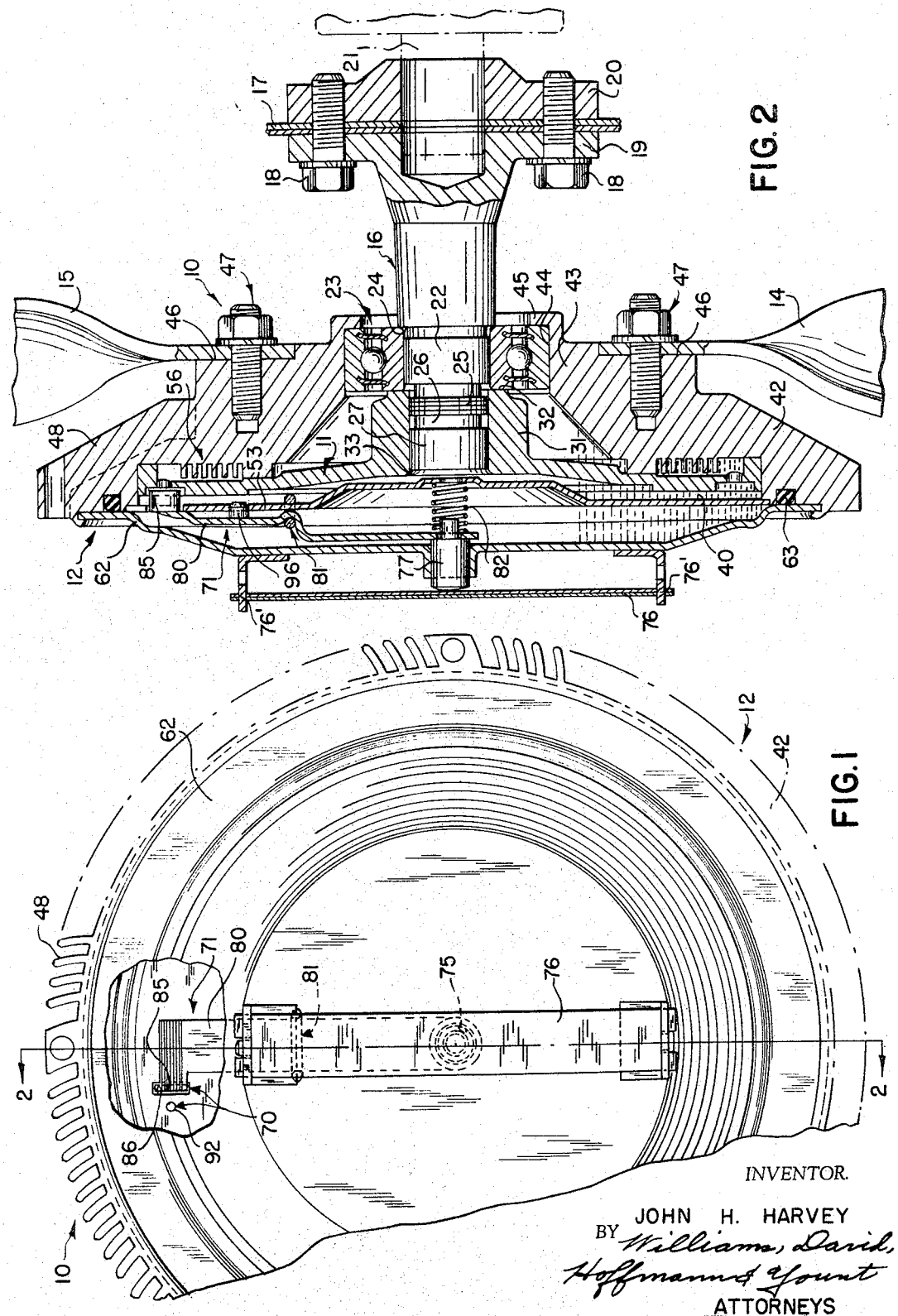

INVENTOR.
JOHN H. HARVEY
BY Williams, David,
Hoffmann & Yount
ATTORNEYS

United States Patent Office 3,339,688
Patented Sept. 5, 1967

3,339,688
COUPLING DEVICE
John H. Harvey, Detroit, Mich., assignor to Eaton Yale
 & Towne Inc., a corporation of Ohio
Filed Sept. 20, 1963, Ser. No. 310,320
26 Claims. (Cl. 192—58)

The present invention relates to fluid couplings of the type embodying a fluid medium for transmitting torque between relatively rotatable input and output coupling members, and particularly, to a shear type fluid coupling wherein the amount of the fluid medium transmitting torque between the rotatable members can be varied to vary the speed of the output member.

Fluid couplings of the above noted type are usable for driving various different kinds of load devices, and have particular utility for driving an engine accessory such as a cooling fan device of an internal combustion engine. Prior art fluid couplings constructed to provide fan drives have included a means for varying the volume of the fluid medium transmitting torque between the input and output members, so that when fan cooling requirements are decreased, the amount of fluid transmitting torque is decreased and the speed differential between the input and output members is increased due to the decrease in volume of the operating fluid medium transmitting torque. Conversely, when fan cooling requirements are increased, the volume of fluid is increased and the speed differential between the input and output members is decreased. These prior art fluid couplings, however, have been relatively complex, and accordingly, the principal object of the present invention is the provision of a new, improved, simple, compact, and highly durable fluid coupling having a minimum of parts and constructed so that the volume of the fluid medium transmitting torque between the input and output members can be readily varied.

A further object of the present invention is the provision of a new and improved fluid coupling wherein a viscous shear fluid medium disposed in a working chamber and between cooperating shear surfaces on the input and output coupling members transmits torque between the members and wherein a simple and reliable mechanism is provided for moving fluid between the working chamber and a reservoir chamber to vary the volume of fluid in the working chamber to thereby vary the amount of torque transmitted to the output member.

Another object of the present invention is the provision of a new and improved fluid coupling having a fluid impact or pumping element movable axially in a first direction to effect fluid flow from the working chamber to the reservoir chamber and in a second direction opposite said first direction to allow for fluid flow into the working chamber from the reservoir chamber.

An additional object of the present invention is the provision of a new and improved fluid coupling, as noted in the next preceding paragraph, wherein the fluid impact or pumping element is pivotally supported by one of the coupling members for movement about an axis extending transverse to the axis of rotation of the coupling members to provide for fluid flow between the working and reservoir chambers.

A further object of the present invention is the provision of a new and improved fluid coupling wherein a fluid impact or pumping element is moved into the working chamber to effect fluid flow therefrom by a temperature responsive device which is effective to move the pumping element into the working chamber at low temperatures and is effective to move the pumping element from the working chamber at high temperatures.

A still further object of the present invention is the provision of a new and improved fluid coupling wherein means is provided for moving fluid between a reservoir chamber and a working chamber including at least one fluid passageway located in a partition member separating the chambers for conducting fluid therethrough in two directions, namely, from the working chamber to the reservoir chamber and from the reservoir chamber to the working chamber, thereby eliminating the need for sizing inlet and outlet reservoir chamber passageways, as required in known prior art fluid couplings.

Still another object of the present invention is the provision of a new and improved fluid coupling, as noted in the next preceding paragraph, having at least one passageway which serves to conduct fluid to the working chamber as well as from the working chamber and further including additional passageway means providing for flow of fluid into the working chamber so that flow into the working chamber is at a faster rate than flow from the working chamber.

A further object of the present invention is the provision of a new and improved fluid coupling wherein means is provided to minimize "droop" or a drop in output torque at high speeds of the input member due to fluid being forced or evacuated from the working chamber because of the high speed of the input member.

Further objects, novel characteristics, and advantages of the present invention will be apparent from the following detailed description of a preferred embodiment made with reference to the accompanying drawings forming a part of the specification and in which, FIG. 1 is a partial end elevational view with portions broken away of a fluid coupling embodying the present invention;

FIG. 2 is an axial sectional view of the fluid coupling of FIG. 1 taken approximately on section line 2—2 of FIG. 1;

Figure 4:
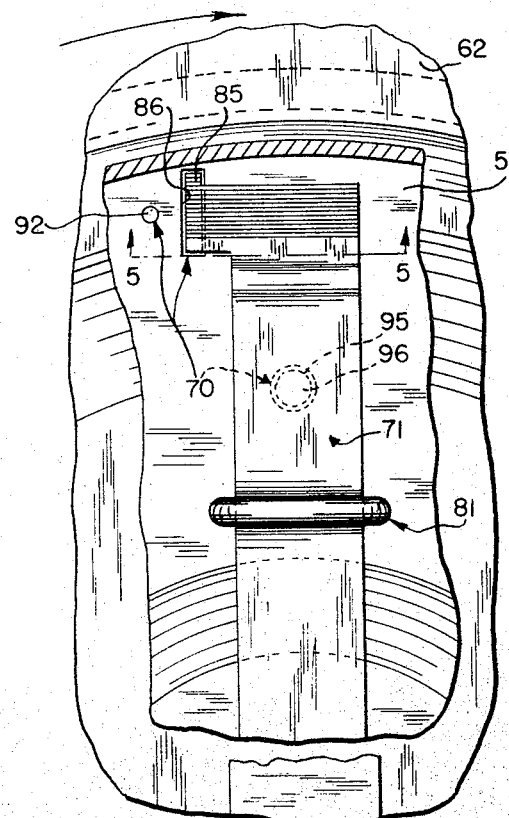
FIG. 4 is a fragmentary vertical section of the fluid coupling shown in FIG. 3 taken approximately on section line 4—4 of FIG. 3.

The present invention provides, in general, a fluid coupling wherein a viscous shear fluid medium cooperates with input and output coupling members to transmit torque therebetween and wherein the volume of the fluid of the fluid medium cooperating with the input and output members can be varied to vary the torque transmitted to the output member. As representing a preferred embodiment of the present invention, a fluid coupling device 10 is shown in the drawings and includes an input coupling member 11 and an output coupling member 12. The coupling 10 is here shown as a drive for an engine accessory, and specifically, as a drive for a radiator cooling fan device. It is to be understood, however, that the novel construction of the preferred embodiment of the present invention is not limited in application to a fan drive, but is usable in any application wherein the torque transmission characteristics of a fluid drive are desired along with means to vary the speed differential between the input and output members by varying the amount of the fluid medium transmitting torque between the coupling members.

Referring to the drawings more specifically, FIG. 2 shows a cooling fan engine accessory including fan blades 14, 15, which are driven from the engine through the fluid coupling 10. The fluid coupling includes an input shaft 16 on which input member 11 is mounted and which is rotatable as by a belt drive including a pulley member 17, only a portion of the latter being shown in the drawings. The pulley member 17 is connected to the input shaft 16 at one end thereof by suitable screws 18 which extend through flange portion 19 on the end of the shaft 16 and through openings in the pulley member. The screws 18 are threaded into a hub plate 20 located on the side of the pulley 17 opposite from the flange portion 19 and are effective to clamp the pulley between flange portion 19 and hub plate 20. The hub plate 20 is suitably mounted on a stub shaft 21 which is rotatably supported by the engine block.

The input shaft 16 has intermediate its ends a reduced shaft portion 22 functioning as a support for the inner race of ball bearing assembly 23. A shoulder 24 on the shaft 16 prevents movement of the ball bearing assembly 23 in one axial direction, namely to the right as viewed in FIG. 2. Another shaft portion 25 is provided with surface serrations and a reduced diameter portion 26 connects shaft portion 25 with a further shaft portion 27, at the end of shaft 16 opposite the end having the flange portion 19.

The rotatable input or driving member 11 of the fluid coupling 10 is in the form of a disk having a hub portion 31 supported by shaft 16. The hub portion 31 has an opening therethrough which has an interference fit with the shaft portions 25 and 27. The hub portion 31 is pressed onto the shaft 16 until the inner surface 32 of the hub 31 abuts the side of the inner race of the ball bearing assembly 23 and thus prevents movement of the ball bearing assembly 23 to the left, as viewed in FIG. 2. The outboard end of shaft portion 27 is flared over at 33 to positively retain coupling member 11 in assembly with input shaft 16. From the above description it should be apparent that the rotation of the shaft 16 causes the input coupling member 11 to be rotated.

The input coupling member 11 rotates in a fluid working or operating chamber 40 having a generally cylindrical shape and formed by the rotatable output or driven coupling member 12. The output coupling member 12 is in the form of a housing and includes a main housing member 42 having a hub portion 43 with an opening 44 therethrough. The opening 44 has an interference fit with the outer race of the ball bearing assembly 23 and is supported thereby for rotation about the axis of the shaft 16. A flange portion 45 engages the right side of the outer race of the ball bearing asesmbly 23, as viewed in FIG. 2, and restrains housing member 42 from movement in one axial direction. The fan blades 14 and 15 are secured to surface portions 46 of the housing member 42 by stud and nut assemblies 47 so as to rotate with the housing member 42. The housing member 42 also includes a plurality of fins 48 for cooling the coupling 10.

Figure 3:
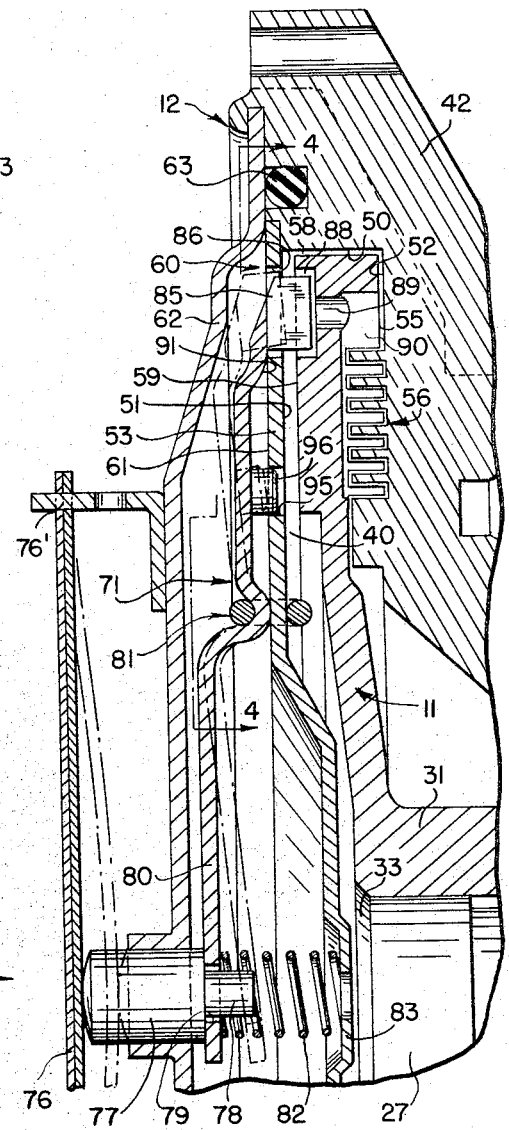
FIG. 3 is a fragmentary view of a portion of the fluid coupling shown in FIG. 2 on a larger scale.

Referring now to FIG. 3, the working chamber 40 formed by the output member 12 is defined by a cylindrical surface 50 coaxial with the shaft 16 and by end surfaces 51, 52. The cylindrical surface 50 is provided by a bore in the housing member 42, and the end surface 52 is located at the bottom of the bore. The end surface 51 of the chamber 40 is provided by a partition member 53 in the form of a disk which extends radially of the shaft 16, and the peripheral edge of which is secured to the housing member 42.

The input member 11 which rotates in the working chamber 40 has a surface portion 55 spaced from the surface 52 of the housing member 42. The surface portion 55 of the input disk member 11 and the surface 52 of the housing member 42 have a cooperating plurality of grooves and lands therein which are designated generally 56 in the drawings. These grooves and lands provide opposed surfaces extending in close parallel face to face relation and have an intervening shear space therebetween. Upon rotation of the disk 11, the fluid in the fluid operating chamber 40 transmits torque from the disk member 11 to the housing member 42, and specifically the fluid in the above mentioned shear space transmits torque between the input and output members by the shear action of the fluid.

The radially outermost surface portion 58 of the disk 11 cooperates with the surface 50 to also provide an intervening shear space therebetween so that when fluid is positioned therebetween, transmission of the torque from the disk member 11 to the housing member 42 is effected. Moreover, the forwardmost surface portion 59 of the disk member 11 cooperates with the surface 51 of the partition member 53 which is spaced therefrom to provide a shear space therebetween to transmit torque between the coupling members when fluid is positioned in this shear space between the surfaces 51 and 59.

The amount of torque transmitted from the disk member 11 to the coupling member 12 is a function of the volume of fluid in the chamber 40 and, specifically, in the above mentioned shear spaces. In the event fluid is not located in any of the shear spaces no torque is transmitted between the input and output members and the speed differential between the input member 11 and the output member 12 is greater than what the differential is when fluid fills or partially fills the shear spaces. It should be apparent from the above description that if there is no fluid in the chamber 40 and consequently no fluid in the shear spaces there would be no transmission of torque between the input and output members, and as the amount of fluid in the chamber 40 increases, an increasing amount of torque is transmitted between the input and output members and the speed differential between the members is decreased.

In order to vary the volume of fluid in the chamber 40 and thus vary the torque transmitted and the speed differential between the input and output members, the fluid coupling 10 includes a means providing for flow of fluid into and from the chamber 40. The fluid supplied to the chamber 40 flows thereinto from a fluid reservoir or storage chamber 60, and the fluid leaving the chamber 40 flows back into the reservoir or storage chamber 60. The reservoir chamber 60 is adjacent working chamber 40 and is formed by the output member 12. The chamber 60 is defined by surface 61 of the partition member 53 which is on the side thereof opposite surface 51, and by a generally circular dish-shaped cover member 62 which forms a portion of the output member 12. The outer peripheral edge of the cover member 62 is secured to the housing member 42 and a suitable sealing ring 63 is positioned therebetween to prevent fluid leakage therebetween.

The means providing for fluid flow between the reservoir or storage chamber 60 and the fluid working chamber 40 includes fluid conducting means, designated 70 in FIG. 4, and communicating the storage chamber 60 with the chamber 40 and a flow control mechanism 71 operable to effect fluid flow between chambers 40 and 60 through the fluid conducting means 70. The flow control mechanism 71 is operable when fan cooling is not desired to effect fluid flow from working or operating chamber 40 into the reservoir chamber 60 to thereby increase the speed differential between input member 11 and output member 12. When fan cooling is desired the flow control mechanism 71 allows for fluid flow into the chamber 40 to increase the torque transmitted between the input and output members, as will be apparent from the description below.

The flow control mechanism 71 includes a temperature responsive device supported by the cover member 62. The temperature responsive device is an elongated bimetal strip or bar-like member 76 anchored at its opposite ends 76' to suitable supports which are in turn secured to the cover member 62. The bimetal member 76 expands and contracts axially in response to changes in the temperature of the atmosphere around the bimetal member 76. When the temperature increases the bimetal member 76 bows axially inwardly and is shown in a bowed condition in dot-dash lines in FIG. 3. When the temperature is very low, the bimetal member would bow in the opposite direction but would not affect clutch performance.

The central portion of the bimetal member 76 engages a pin or cylinder member 77 which is slidably supported by the cover member 62 and located centrally thereof on the axis of rotation of the coupling members. When the bimetal member 76 moves axially or bows the pin member 77 is moved axially thereby. The pin member 77 includes a projecting portion 78 which extends through an opening 79 in a radially extending arm member 80 forming a part of the flow control mechanism 71. The arm member 80 is movable generally axially of the coupling members and to this end it is pivoted intermediate its ends by a suitable pivot arrangement 81 supported by the partition member 53 and providing for pivotal movement of the arm 80 about an axis transverse to the axis of shaft 16.

The arm member 80 is biased in a clockwise direction about pivot 81 and is held in tight engagement with the right side of the pin member 77, as viewed in FIG. 2, by a suitable coil spring 82. The spring 82 also functions to bias the pin member 77 into engagement with the bimetal member 76. A portion of the spring 82 encircles projecting portion 78 of the pin, and one end of the spring 82 engages the arm member 80, and the other end of the spring 82 engages a suitable reaction portion 83 of the partition member 51. When the temperature sensing device 76 senses an increase in the temperature surrounding the coupling 12, it expands or bows axially to the position shown in dot-dash lines in FIG. 3 and thereby slides the pin 77 axially against the bias of spring 82. Movement of the pin 77 axially against the bias of spring 82 causes pivotal movement of the arm 80 in a counterclockwise direction, as viewed in FIG. 3. As the bimetal member 76 returns to its full-line position illustrated in FIG. 3, the spring 82 maintains the pin member 77 in engagement with the bimetal member 76 and effects movement of the pin 70 to the left as viewed in FIG. 3 and movement of the arm 80 in a clockwise direction about its pivot 81.

The outermost end of the arm 80 carries or supports a pumping or fluid impact element 85 which extends into an opening or slot 86 in the partition member 53. The impact element 85 is movable axially in opposite directions between a pumping position, shown in full lines in FIG. 3, and an operating position, shown in dot-dash lines in FIG. 3 upon movement of the arm 80 by the temperature sensing device 76, as described above. The impact element 85 when in pumping position extends into the working chamber 40 and when in its operating position is located substantially out of chamber 40.

When the impact element 85 is in its pumping position the free end or outermost portion thereof extends into a circumferentially extending raceway or groove 88 formed in the surface 59 of the input member 11. The groove 88 is connected to the shear space between surfaces 52, 55 of the output and input members, respectively, by a plurality of axially directed passages or holes 89 extending through input member 11 and disposed slightly radially outwardly of the lands and grooves 56. The holes 89 terminate, or alternatively, are cut away in the form of a V-notch 90 extending radially inwardly from the holes 89 to beyond the cooperating grooves and lands 56, for a purpose to be described hereinbelow. When the impact element 85 is in its operating position it is located out of the groove 88 and its outermost portion is preferably located in the slot 86, as shown in dot-dash lines in FIG. 3, substantially out of working chamber 40.

The impact element 85 is biased toward its pumping position by the spring 82 which biases arm 80 in a clockwise direction, and thus biases element 85 toward the right, as viewed in FIG. 3. Movement of the impact element 85 toward the right as viewed in FIG. 3 is limited by a portion 91 of the arm 80 which engages the surface 61 of partition plate 53 when the impact element 85 reaches its pumping position. As the temperature responsive device 76 moves axially and moves the arm 80 counterclockwise, the impact element 85 moves axially toward the left, as viewed in FIG. 3. Movement of the impact element toward the left as viewed in FIG. 3 is limited by engagement of the arm 80 with the cover member 62 when the impact element reaches its operating position, shown in dot-dash lines in FIG. 3. From the above description it should be apparent that the position of the impact element 85 is determined by the temperature response bimetal strip 76, and the impact element 85 may be located in either its pumping or operating position, as described above, or in an intermediate position.

Figure 5:
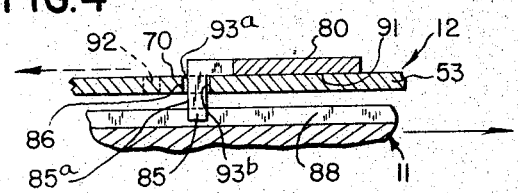
FIG. 5 is a fragmentary section of the fluid coupling shown in FIG. 4, with certain parts omitted, taken approximately on section line 5—5 of FIG. 4.

The position of the impact element 85 determines the volume of fluid in the working chamber and movement thereof effects the flow of fluid between the working and storage chambers through the fluid conducting means 70. The fluid conducting means 70 communicating the reservoir or storage chamber 60 with the operating chamber 40 comprises an opening or fluid passage 92 in the partition member 53 which is spaced circumferentially from the slot 86 through which the impact element 85 moves. The passage 92 is spaced from slot 86 in a direction which is opposite the direction in which the coupling members 11, 12 rotate. The coupling members rotate in a clockwise direction as viewed in FIG. 4 and as indicated by the arrow in FIG. 4 and to the right, as viewed in FIG. 5 and as indicated by the full line arrow in FIG. 5. The resistance to rotation offered by the fan blades 14, 15 causes the outer or driven coupling member 12 to lag behind the inner or driving coupling member 11 and provides a relative rotation between the coupling members 11, 12. This relative rotation can be accurately described as a counterclockwise rotation of the outer or driven coupling member 12 relative to the inner coupling member 11. The direction of relative rotation of the driven coupling member 12 relative to the driving coupling member 11 is indicated by the dotted arrow pointing to the left in FIG. 5.

The above described relative rotation between the coupling members 11, 12 results in fluid being impacted against surface 85a of the pumping element 85 when moved to its pumping position. This creates a fluid pressure forwardly of the surface 85a of the impact element, and in the general location of passage 92, which pressure causes the fluid medium in the chamber 40 to enter passage 92 and flow therethrough into reservoir chamber 60 until an equilibrium condition is achieved at which only a minimum volume of fluid is located in the chamber 40. When an equilibrium condition is reached the pressure in chamber 40 adjacent opening 92 is equal to the pressure in chamber 60 adjacent the opening 92. When the impact element 85 is moved to its operating position, centrifugal force causes the fluid to flow through passage 92 into chamber 40. The fluid is then toroidally positioned in both chambers, and the fluid seeks the same toroidal level in both chambers and again reaches an equilibrium condition. Thus, the opening 92 functions to direct fluid into chamber 40 as well as from chamber 40. The V-notch 90, passages 89, and groove 88 function to direct fluid to and from the lands and grooves 56 depending upon the position of impact element 85 to vary the volume of fluid therebetween.

When the impact element is moved to an intermediate position, fluid flow between the chambers 40 and 60 is effected until a state of fluid equilibrium is attained. When the impact element 85 moves from any given position toward its pumping position, a greater area of the impact element is positioned in the working chamber 40 and fluid is thereby impacted against a greater area of surface 85a causing fluid pressure forward of surface 85a adjacent opening 92 to increase and thereby effect fluid flow from chamber 40, as described above. If the impact element moves from a given position toward its operating position a lesser area of the impact element is positioned in the working chamber 40 and fluid is impacted against a lesser area of surface 85a causing fluid pressure forward of surface 85a and adjacent opening 92 to decrease and thereby effect fluid flow into the working chamber, as described above.

The fluid conducting means 70 also includes a small clearance which is provided between the impact element 85 and the slot 86 through which it moves and this clearance also functions to direct fluid into and from working chamber 40. This clearance includes a portion 93a on the side of the impact element 85 adjacent surface 85a. The portion 93a functions to direct fluid into and from the working chamber 40. The clearance also includes a portion 93b on the opposite side of the impact element and provides for fluid flow into the working chamber 40. This clearance 93b is held to a minimum so as to minimize flow into the chamber 40 therethrough when impact element 85 is in its pumping position.

Preferably, the fluid conducting means 70 includes a suitable opening 95 in the partition member 53, in addition to the opening 92, to provide for higher rate fluid flow into the chamber 40 when it is desired to increase the volume of the fluid medium in the chamber 40. The opening 95 is spaced radially inwardly of the opening 92 through which the fluid is pumped and a suitable plug element 96 is supported on the arm 80 to close the opening 95 when the impact element 85 is in its pumping position and to restrict flow therethrough as the impact element moves to the right, as viewed in FIG. 3, toward its pumping position. As the impact element moves to the left, as viewed in FIG. 3, the plug element 96 restricts flow through opening 95 to a lesser extent and thus allows for an increase in fluid flow therethrough. Accordingly, fluid flows through opening 95 to assist in filling chamber 40 when torque transmission is to be increased.

The opening 95 has the additional function of preventing fan speed from falling off at high slip speeds, normally referred to as "droop." More specifically, at high slip speeds, the speed of the input member 11 is relatively high, and the input member 11 is rotating substantially faster than the output member 12. Due to this high relative speed of the input member 11, the centrifugal head or pressure of the fluid in the operating chamber 40 is extremely great and is in excess of the centrifugal head or pressure of the fluid in the reservoir chamber 60 and fluid is thereby forced from the operating chamber 40 through passage 92 into the reservoir chamber 60. This flow or fluid from the operating chamber 40, of course, reduces the amount of fluid therein and thereby decreases the torque transmitted from the input element to the output member. This decrease in torque transmission causes a falling off of fan speed and results in a decrease or "droop" in the output torque. By providing the opening 95 additional fluid may flow therethrough into the operating chamber when the input member 11 is operating at high speeds, and if any fluid is evacuated from the working chamber 40, there is no substantial decrease in the volume of fluid therein and thus "droop" in the output torque is minimized. Thus, the opening 95 tends to maintain the desired volume of fluid in the working or operating chamber 40 independent of the speed of the input or driving coupling member 11.

The operation of the above described coupling mechanism should be apparent. When fan cooling requirements are low, the pumping element 85 is located in its pumping position and effects fluid flow through the opening 92 and clearance portion 93a from the fluid working chamber 40 into the storage chamber 60, as described above. The evacuation of the fluid from the chamber 40 increases the speed differential between the output member 12 and the input member 11 so as to thereby reduce the speed of the output member 12 and the speed of the fan blades 14, 15 to a minimum.

When fan cooling requirements are increased such as when the ambient temperature around the coupling device increases, the temperature sensing device 76, in response to sensing the increased temperature, expands and moves the arm 80 in a counterclockwise direction. This causes the pumping element 85 to be moved axially to the left, as viewed in FIG. 3, and ultimately to its operating position and fluid flows through the openings 92, 95 and the clearance between slot 86 and impact element 85 from the reservoir chamber 60 into the working chamber 40. By increasing the fluid in the working chamber 40 the speed differential between the input member 11 and the output member 12 is decreased, thereby increasing the speed of the fan blades 14, 15 and providing for increased fan cooling.

At intermediate positions of the impact element 85 and as the impact element is moved to the left, as viewed in FIG. 3, and withdrawn from the working chamber 40, it allows for fluid flow into the working chamber 40. When the impact element 85 is moved to the right, as viewed in FIG. 3, it becomes more effective to provide fluid flow from the operating chamber. When the impact element is held at any given intermediate position, a state of fluid equilibrium is attained between the chambers 40 and 60, and the fluid level in the operating chamber 40 is at some intermediate point so that some part but not necessarily all of the grooves are filled with fluid and specifically a given number of outer grooves are filled with fluid. The volume of the fluid in the operating chamber and the number of grooves in which fluid is located is determined by the given intermediate position of the impact element.

Figure 6:
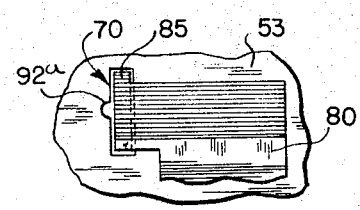
FIG. 6 is a schematic end elevational view of a portion of a modified form of fluid coupling embodying the present invention.

FIG. 6 shows a partial view of a modified fluid coupling which is substantially of the same construction and operation as the fluid coupling 10 and in view of this similarity the same reference numerals, used to designate parts of the coupling 10 shown in FIGS. 1 to 5, are used to designate corresponding parts of the coupling shown in FIG. 6. The arm member 80 is the modification shown in FIG. 6 which carries the pumping element 85 and moves in response to temperature changes so that when the temperature is increased the arm member 80 will move to a position wherein the impact element 85 does not extend into the operating chamber 40. When fan cooling requirements are low, the arm member 80 will take a position wherein the impact element 85 extends into the working chamber thereby evacuating fluid from the working chamber into the storage chamber, as described above in connection with the modification in FIG. 1.

The fluid conducting means 70 communicating the storage chamber and the working chamber in the modified fluid coupling shown in FIG. 6 includes an opening 92a formed as an enlarged integral portion of the slot 86 through which the pumping element 85 moves when it is moving into the working chamber. The opening 92a serves to direct fluid from the working chamber when the pumping element 85 is in its pumping position and to the chamber 40 when the pumping element 85 is in its operating position.

It should be understood that the preferred embodiment of the present invention has been described herein in considerable detail and that certain modifications, changes and adaptations may be made therein by those skilled in the art and that it is hereby intended to cover all modifications, changes and adaptations thereof falling within the scope of the appended claims.

Having described my invention, I claim:

1. A fluid coupling comprising a first rotatable member, a second rotatable member disposed adjacent said first rotatable member, said first and second rotatable members having spaced opposed surface portions defining a shear space therebetween cooperable with a fluid shear medium within said shear space to provide a shear-type fluid drive between said members, a fluid reservoir chamber adjacent said shear space, means providing fluid conducting means communicating said fluid reservoir chamber and said shear space, said fluid conducting means providing for fluid flow between said shear space and said fluid reservoir chamber, and a pumping element supported on one of said members and movable axially of said one of said members in a first axial direction to allow for fluid flow into said space through said fluid conducting means and in a second axial direction opposite said first axial direction to effect movement of fluid from said shear space through said fluid conducting means into said reservoir chamber.

2. A fluid coupling as defined in claim 1 wherein said pumping element is pivotally supported by said one of said members for pivotal movement about an axis transverse to the axis of rotation of said one of said members.

3. A fluid coupling comprising first and second relatively rotatable coupling members, said first coupling member defining a first fluid chamber, said second coupling member having at least a portion of the outer periphery thereof rotatable in said first fluid chamber, said first and second rotatable coupling members having spaced opposed surface portions cooperable with a fluid shear medium within said first fluid chamber to provide a shear-type fluid drive between said members, a second fluid chamber adjacent said first fluid chamber, means providing fluid conducting means communicating said first and second fluid chambers and providing for fluid flow between said first and second fluid chambers, and fluid flow control means including a flow producing element supported on one of said rotatable coupling members and movable axially of said one of said rotatable coupling members from an operative position allowing for fluid flow through said fluid conducting means into said first fluid chamber to a position wherein it is effective to move fluid from said first fluid chamber through said fluid conducting means into said second fluid chamber.

4. A fluid coupling as defined in claim 3 wherein said element is supported by said one of said rotatable coupling members for pivotal movement relative thereto about an axis extending transverse to the axis of rotation thereof.

5. A fluid coupling comprising first and second relatively rotatable coupling members, said first coupling member including first fluid chamber means, said second coupling member having at least a portion of the outer periphery thereof rotatable in said first fluid chamber means, said first and second rotatable coupling members having spaced opposed surface portions cooperable with fluid means within said first fluid chamber means to provide a shear-type fluid drive between said members, a second fluid chamber means adjacent said first fluid chamber means, means providing fluid conducting means communicating said first and second fluid chamber means and providing for fluid flow between said first and second fluid chamber means, and a pumping element rotatable with one of said members and movable generally axially of said one of said members from an operating position allowing for fluid flow through said fluid conducting means from said second fluid chamber means into said first fluid chamber means to a pumping position projecting into said first chamber to move fluid from said first fluid chamber means through said fluid conducting means into said second fluid chamber means.

6. A fluid coupling comprising first and second relatively rotatable coupling members, said first coupling member including first fluid chamber means, said second coupling member having at least a portion of its periphery rotatable in said first chamber means, said first and second rotatable members having spaced opposed surface portions cooperable with fluid means within said first fluid chamber means to provide a shear type fluid drive between said members, a second fluid chamber means adjacent said first fluid chamber means, fluid conducting means communicating said first and second fluid chamber means and providing for fluid flow between said first and second fluid chamber means, and a pumping element rotatable with one of said members and movable in a first direction to allow for fluid flow through said fluid conducting means from said second fluid chamber means into said first fluid chamber means and a second direction opposite said first direction to effect movement of fluid from said first fluid chamber means through said fluid conducting means into said second fluid chamber means.

7. A fluid coupling as defined in claim 6 wherein said pumping element is pivotally supported by said one of said members for pivotal movement about an axis transverse to the axis of rotation of said coupling members.

8. A fluid coupling device comprising first and second rotatable coupling members, said coupling members having a working chamber and a reservoir chamber separated by a partition member, said second coupling member concentric with said first coupling member and having at least a portion thereof rotatable in said working chamber, said first and second coupling members having spaced opposed surface portions cooperable with fluid means in said working chamber to provide a shear-type fluid drive between said coupling members, means providing fluid conducting passage means in said partition member communicating said reservoir and working chambers, and a pumping element rotatable with said first coupling member and movable generally axially of said first coupling member in a first direction to allow for fluid flow through said fluid conducting passage means into said working chamber from said reservoir chamber and in a second direction opposite said first direction to effect movement of fluid from said working chamber through said fluid conducting passage means into said reservoir chamber.

9. A fluid coupling as defined in claim 8 wherein said partition member has means providing a first opening therethrough in which said pumping element moves, and the coupling further includes a radially extending arm member supporting said pumping element, pivot means supporting said arm member for pivotal movement relative to said first coupling member, and temperature responsive means for pivoting said supporting arm member between said positions.

10. A fluid coupling as defined in claim 9 wherein said pivot means pivotally secures said arm member to said partition member for pivoting movement about an axis extending transverse to the axis of rotation of said coupling members.

11. A fluid coupling as defined in claim 9 wherein said fluid conducting passage means includes a second opening in the partition member spaced from said first opening circumferentially in a direction opposite the direction of rotation of said first and second coupling members.

12. A fluid coupling as defined in claim 11 wherein said fluid conducting passage means further includes clearance space between said first opening and said pumping element.

13. A fluid coupling as defined in claim 9 wherein said reservoir chamber is defined by said partition member and a cover member for supporting said temperature responsive device, and said temperature responsive device includes a bimetallic strip member secured at its ends to said cover member and having an axially bowed condition attained in response to a rise in the temperature thereof for effecting movement of said supporting arm in response to bowing thereof.

14. A fluid coupling as defined in claim 8 wherein said input coupling member comprises a disk member having an annular groove extending circumferentially thereof and said pumping element when in said pumping position extends into said groove.

15. A fluid coupling device comprising first and second rotatable coupling members, said first coupling member having a working chamber and a reservoir chamber separated by a partition member, said second coupling member concentric with said first coupling member and having at least a portion thereof rotatable in said working chamber, said first and second coupling members having spaced opposed surface portions cooperable with fluid means in said working chamber to provide a shear-type fluid drive between said members, means providing a fluid conducting opening in said partition member communicating said reservoir and working chambers, and a pumping element rotatable with said first coupling member and movable from an operating position allowing for fluid flow through said fluid conducting opening into the working chamber from the reservoir chamber to a pumping position for moving fluid from said working chamber through said fluid conducting opening into said reservoir chamber.

16. A fluid coupling device as defined in claim 15 wherein said fluid conducting opening comprises a first opening in said partition member in which said pumping element is positioned and a second opening formed as an integral portion of said first opening.

17. A fluid coupling device comprising first and second rotatable coupling members, said first coupling member having a working chamber and a reservoir chamber separated by a partition member, said second coupling member having at least a portion thereof rotatable in said working chamber, said first and second coupling members having spaced opposed surface portions cooperable with fluid means in said working chamber to provide a shear-type fluid drive therebetween, means providing a first fluid passage means in said partition member communicating said reservoir and working chambers, and a pumping element rotatable with said first coupling member and movable relative to said first coupling member in a first direction to allow for fluid flow through said fluid conducting passage means into said working chamber from said reservoir chamber and in a second direction opposite said first direction to effect movement of fluid from said working chamber through said first fluid passage means into said reservoir chamber, said partition member including a second fluid passage means connecting said working and reservoir chambers and providing for fluid flow into said working chamber when said pumping element moves in said first direction in addition to the fluid flowing through said first fluid passage means to maintain a predetermined volume of fluid in said working chamber independent of the speed of the second coupling member to prevent a substantial drop in the speed of said first coupling member at high speeds of the second coupling member which creates pressures on the fluid such that fluid flows through said first fluid passage means from said working chamber.

18. A fluid coupling as defined in claim 17 further comprising a blocking member movable with said pumping element for limiting fluid flow through said second fluid passage when said impact element moves in said second direction and increasing fluid flow through said second fluid passage when said impact element moves in said first direction.

19. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port but trailing said port in the direction of rotation of said plate relative to said drive disc, said abutment member being movable between an active position in which it extends from the surface of said plate into said drive chamber and an inactive position wherein it is withdrawn from said drive chamber, an element movably mounted within said casing and having a portion cooperating with said abutment member for movement thereof, temperature responsive means mounted exteriorly of said outer casing and having means extending within said casing engaging said element to control the position of said abutment member to thereby vary the degree of coupling of said casing and said disc with changes in said temperature.

20. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port but trailing said port in the direction of rotation of said plate relative to said drive dics, said abutment member being movable between an active position in which it extends from the surface of said plate into said drive chamber and an inactive position wherein it is withdrawn from said drive chamber, temperature responsive means mounted exteriorly of said outer casing and having means cooperating with said abutment member to control the position of said abutment member to thereby vary the degree of coupling of said casing and said disc with changes in said temperature.

21. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said drive means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port, said abutment member being movable between an active position in which it extends from the surface of said plate into said drive chamber and an inactive position wherein it is withdrawn from said drive chamber, temperature responsive means mounted exteriorly of said outer casing and including means cooperating with said abutment member to exert a force thereon effective to shift said abutment member between its said active and inactive positions, said force varying with changes in the temperature ambient to said temperature responsive means to thereby vary the degree of coupling of said casing and said disc with changes in said temperature.

22. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port but trailing said port in the direction of rotation of said plate relative to said drive disc, said abutment member being movable between an active position in which it extends into the path of the fluid in the drive chamber and an inactive position where it is withdrawn from said fluid path, an element movably mounted within said casing and having a portion cooperating with said abutment member for movement thereof, and temperature responsive means including means cooperating with said abutment member to exert a force thereon effective to shift said abutment member between its said active and inactive positions, said force varying with changes in the temperature ambient to said temperature responsive means to thereby vary the degree of coupling of said casing and said disc with changes in said temperature.

23. A fluid coupling device comprising a drive shaft, driven means comprising an outer casing and divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, a port in said driven means providing fluid communication between said reservoir and said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port but trailing said port in the direction of rotation of said plate relative to said drive disc, said abutment member being movable between an active position in which it extends into the path of the fluid in the drive chamber and an inactive position wherein it is withdrawn from said fluid path, and condition responsive means for shifting said abutment member between its said positions, whereby fluid is transferred between said drive chamber and said storage chamber in response to changes in said condition to thereby vary the degree of coupling between said casing and said disc.

24. A torque transmitting device comprising a first element, a second element supported on said first element and rotatable relative thereto, shear surfaces carried by said first and second elements and forming a drive chamber therebetween, a fluid reservoir chamber adjacent said drive chamber, an aperture in said second element providing a port communicating with said drive and reservoir chambers, pump means for transferring fluid from said drive chamber to said reservoir chamber during rotation of said device, said pump means comprising an abutment member supported on said second element adjacent said port but trailing said port in the direction of rotation of said second element with relation to said first element, said abutment member being movable between an active position in which it extends into the path of fluid in the drive chamber and renders said pump means operable to transfer fluid and an inactive position wherein it is withdrawn from said fluid path and renders said pump means inoperable to transfer fluid, and condition responsive means for moving said abutment member between its said positions.

25. A torque transmitting device comprising a first element, a second element supported on said first element and rotatable relative thereto, shear surfaces carried by said first and second elements and forming a drive chamber therebetween, a fluid reservoir chamber adjacent said drive chamber, port means in said second element providing fluid communication between said drive and reservoir chambers, pump means for transferring fluid from said drive chamber to said reservoir chamber through said port means during rotation of said device, said pump means comprising a movable abutment member cooperating with said port means, said abutment member being movable between an active position in which it extends into the path of the fluid in the drive chamber and renders said pump means operable to transfer fluid and an inactive position wherein it is withdrawn from said fluid path and renders said pump means inoperable to transfer fluid, and condition responsive means for moving said abutment member between its said positions.

26. A fluid coupling device comprising first and second rotatable coupling members, said first coupling member having a working chamber and a reservoir chamber separated by a partition member, said second coupling member concentric with said first coupling member and having at least a portion thereof rotatable in said working chamber, said first and second coupling members having spaced opposed surface portions cooperable with fluid means in said working chamber to provide a shear-type fluid drive between said coupling members, means providing fluid conducting passage means in said partition member communicating said reservoir and working chambers, and a pumping element rotatable with said first coupling member and movable generally axially of said first coupling member in a first direction to allow for fluid flow through said fluid conducting passage means into said working chamber from said reservoir chamber and in a second direction opposite said first direction to effect movement of fluid from said working chamber through said fluid conducting passage means into said reservoir chamber, said partition member has means providing a first opening therethrough in which said pumping element moves, and the coupling further includes a radially extending arm member supporting said pumping element, pivot means supporting said arm member for pivotal movement relative to said first coupling member, and temperature responsive means for pivoting said support arm member between said positions, said fluid conducting passage means includes a second opening in the partition member spaced from said first opening circumferentially in a direction opposite the direction of rotation of said first and second coupling members, said fluid conducting passage means further includes a third opening in said partition member communicating said working and reservoir chambers and the coupling further includes a blocking member movable with said arm member to restrict fluid flow through said third opening when said pumping element moves in said second direction and allows for fluid flow through said third opening when said pumping element moves in said first direction.

References Cited
UNITED STATES PATENTS
3,135,370 6/1964 Sutton _____ 192—58
3,191,733 6/1965 Weir _____ 192—58

MARK NEWMAN, *Primary Examiner.*

DON A. WAITE, DAVID J. WILLIAMOWSKY,
*Examiners.*

A. T. McKEON, *Assistant Examiner.*